March 8, 1949.  D. W. HANSEN ET AL  2,464,081
MODIFICATION OF STARCH
Filed March 8, 1946
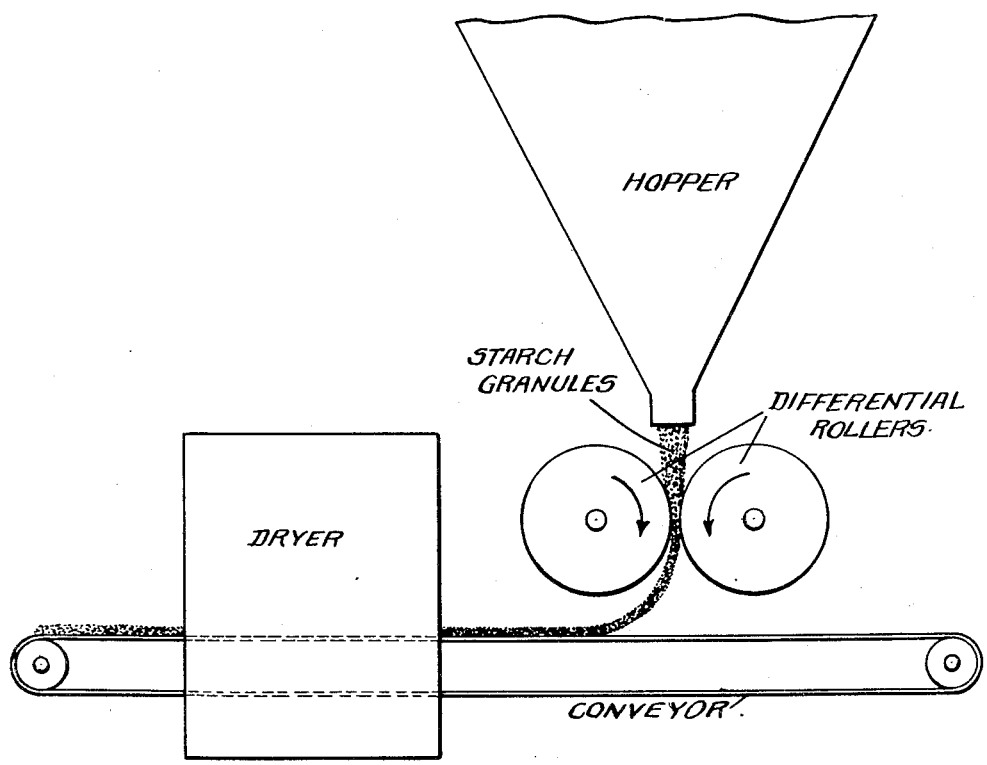
INVENTORS.
Donald W. Hansen,
Lowell O. Gill,
John H. Wrightsman,
By Cromwell, Greist + Warden
attys.

Patented Mar. 8, 1949

2,464,081

UNITED STATES PATENT OFFICE 2,464,081

MODIFICATION OF STARCH

Donald W. Hansen, Lowell O. Gill, and John H. Wrightsman, Decatur, Ill., assignors to A. E. Staley Manufacturing Co., Decatur, Ill., a corporation of Delaware Application March 8, 1946, Serial No. 653,130

11 Claims. (Cl. 127—32)

This invention relates to an improved process for the modification of the starch content of starchy materials and to the products produced thereby. More specifically, it pertains to an improved starch modification process characterized by milling moist starch granules between relatively movable members at temperatures below the pasting temperature of the starch, and to the products thus obtained. Starch granules modified according to the process of this invention differ from the original granules by increased ability to swell in cold water, by partial or complete loss of the polarization "cross" and by a reduction in pasting temperature.

A principal object of this invention is the provision of a process for physically modifying starch which can be easily controlled to give a product of predetermined properties, and which yields a product of uniform quality.

An additional object of the invention is the provision of a process for physically modifying the starch content of starchy materials, which process yields the starch or starchy material in an apparently dry form that is easily pulverized and readily dispersed by cold water into its component fragments or granules.

A further object of the invention is the provision of an improved method for modifying starch, the method being based upon rapid mechanical working or distortion of the starch granules by application thereto of high shearing stresses at temperatures below the pasting temperature of the starch, such as, for example, by milling the moist starch granules with differential rolls.

Another object of the invention is the provision of an improved method for physically modifying starch which comprises mixing the starch with an agent that facilitates dispersion of the modified material in cold water and then subjecting the particles of the mixture to rapid mechanical working or distortion by application thereto of high shearing stresses at temperatures below the pasting temperature of the starch.

An additional object of the invention is the provision of an improved process for physically modifying several properties of starch over wide ranges of values, among these being: swelling of the granules in cold water; viscosity of a suspension of the granules in cold water; proportion of the granules exhibiting polarization crosses; and pasting temperature.

Still another object of the invention is the provision of novel modified starch products.

These and other objects of the invention will become apparent upon consideration of the following description of the invention and appended claims.

The sole figure is a diagrammatic representation in end elevation of a preferred form of machine useful in practicing the invention.

Our improved process is based upon a brief application of high shearing stress to moistened starch granules at temperatures below the starch pasting temperature. This is accomplished by passing the moistened starch one or more times through cooled differential rolls spaced a very short distance apart as shown in the drawing. The starch granules, being somewhat plasticized by their moisture content, are thus distorted or worked without being appreciably fragmented. The effect of this distortion of working is to break down the organization of the granule, as indicated by disappearance of their polarization "crosses," and to modify other properties of the starch as indicated above.

Our process is designed primarily to yield a modified starch consisting mostly of unitary granules that have lost their polarization "crosses" and that swell only to a limited extent in cold water, but which are capable of swelling more in hot water. Prolonged application of our process to starch may, under certain conditions, however, yield a product that swells in cold water to such an extent that the paste thus produced will not thicken additionally when heated.

We have found that the moisture content of the starch to be modified is an important factor in the process. If the starch is too dry it passes through the differential rolls in a powdery state with low absorption of power and without appreciable change in properties. On the other hand, if the starch is too moist, it passes through the rolls in an extremely plastic or rubbery condition, again with low absorption of power and with but slight change in properties. The approximate operating limits with respect to moisture contents of various starches are as follows:

| Kind of Starch | Percent Moisture | |
|---|---|---|
| | Lower Limit | Upper Limit |
| Corn | 17 | 34 |
| Waxy Maize | 12 | 35 |
| Rice | 10 | 35 |
| Wheat | 15 | 37 |
| Tapioca | 11 | 38 |
| Sweet Potato | 11 | 38 |
| Irish Potato | 11 | 40 |
| Sorghum | 11 | 40 |

For starches in general, the moisture limits lie within the range of about 10 to 40 per cent.

The maximum temperature attained by the moist starch granule while it is being worked is also an important factor in the process. We have found that fusing of the granules into structureless masses occurs when they are worked at or above their pasting temperature, whereas, relatively little such fusing occurs at lower temperatures. Apparently the resistance to extreme deformation and rupturing of the moist granule decreases rapidly as its pasting temperature is approached. The fused masses of starch dry into hard tough lumps that are difficult to grind and to disperse in cold water. Some retrogradation of the starch into a form that is essentially non-swelling in either cold or hot water also occurs during the fusing. Since fusing is objectionable to the contemplated uses of the modified starch, we restrict heating of the worked granules in our process to temperatures below the starch pasting temperature. This temperature is defined hereinafter, and varies over the range of about 130° F. to 185° F. for the various starches.

We have found that disintegration of the modified starch mass in cold water into its component granules can be facilitated by adding a small proportion of a suitable dispersing agent to the starch beforehand. We prefer to use aluminum sulfate for this purpose. The alum appears to toughen or harden the starch granules enough to prevent their fusing, but not so much as to prevent the required breakdown in their organization. The proportion of alum required varies with the kind of starch and with the operating conditions. In general, not more than 5 per cent hydrated alum based on the starch is needed, and usually as little as 1 or 2 per cent is sufficient. Preferably the alum is first dissolved in water and then mixed with the starch prior to milling. Substances other than aluminum sulfate may be added to the starch to prevent fusing of the granules and difficult dispersion in cold water. For example, formaldehyde may replace alum.

The process of this invention is applicable to the starch content of starchy or starch-rich materials in general. The expression "starch content of starchy or starch-rich materials in general" is meant to include native starches such as those of wheat, rice, Irish potato, sweet potato, corn, waxy maize, tapioca, sorghum, and waxy sorghum. This expression is also intended to include all modifications of native starches whose granules still possess a definite organization as indicated by exhibition of polarization "crosses." Examples of such modified starches are the so-called thin boiling types prepared by treating the starch with acids or with oxidizing agents such as sodium hypochlorite. Also, the expression is intended to include such materials as the cereal flours, either refined or crude, and mill starch or table heads obtained in the wet milling of corn. In general, the presence of minor proportions of extraneous materials does not seriously interfere with the physical modification of the starch. Interference occurs only in case the non-starchy material is present in such proportion and is of such nature that it absorbs practically all the power of the rolls, thus protecting the starch granules against the necessary distortion or working. The starch granules in table tails containing only about 50 per cent starch have been successfully modified by our process; i. e., the granules lost their polarization "crosses" and swelled to a limited extent in cold water. This is an example illustrating the high proporton of non-starchy material that may be present in the starchy material to be modified.

Modification of starch by the process of this invention is indicated in these three ways: (1) by an increase in the viscosity of a suspension of the modified starchy material in cold water, due to an increased swelling of the starch granules in cold water, (2) by a decrease in the temperature at which a definite viscosity of a suspension of the starchy material in water is reached when the suspension is heated, i. e., a reduction in pasting temperature, and (3) by disappearance of polarization "crosses" in the starch granules. Measurements of these three properties or attributes may be conveniently carried out as follows:

*Viscosity of a suspension of the starchy material in cold water.*—This is determined with a MacMichael viscosimeter. Thirty grams of the starchy material ground to pass a 65 mesh screen is stirred for 2 minutes with 250 ml. of water at 30° C., and then allowed to stand for 30 minutes at the same temperature. The suspension is then placed in the large viscosimeter cup with the disk plunger attached to a No. 26 or No. 30 wire. The cup is rotated at 40 R. P. M. The resulting twist on the wire, which is a measure of the suspension viscosity, is read in degrees MacMichael (°M.). The No. 30 wire is used on the less viscous suspensions and will give readings 6 times greater than the No. 26 wire.

*Variation of viscosity of a suspension of the starchy material in water with temperature.*—This is conveniently determined with a Stormer viscosimeter. A suspension of 6.60 grams of dry substance starchy material in 75 ml. of water at 90° F. is prepared and placed in the viscosimeter cup which contains a rotatable cylinder and which is surrounded by a water bath at 90° F. The cylinder, immersed in the suspension of starchy material, is made to rotate by means of a 100 gram weight attached to a flexible cord running over a pulley and wrapped around the shaft of a gear whose teeth engage a worm on the projecting shaft of the cylinder. The time in seconds for the cylinder to make 100 revolutions is taken as a measure of the suspension viscosity. The temperature of the water bath is then slowly raised by means of a gas flame or electric heater, and the viscosity of the starch suspension is determined at intervals of 10° F. Plotting of suspension temperature against viscosity (i. e., time in seconds for 100 revolutions of the cylinder) yields a graph from which one may read viscosity for any given temperature.

The pasting or gelatinization temperature of ordinary corn starch is generally considered to be about 160° F. This is the temperature at which such starch exhibits a viscosity of about 10 seconds on the Stormer viscosimeter as determined according to the foregoing procedure. For this reason we regard the pasting or gelatinization temperature of starchy materials in general as that temperature at which their Stormer viscosity, measured as described above, amounts to 10 seconds.

*Microscopic examination of the starchy material.*—This is done by observing the appearance of a suspension of one part of the ground starchy material in 100 parts of cold water. When native starches are so examined with ordinary white light, the individual starch granules appear in an undamaged, undistorted condition. When starch that has been modified under the optimum conditions of our process is examined in the same way, a high proportion of the material appears as individual granules, but most of these are cracked or distorted.

To avoid undesirable fusing of starch granules during our treatment we add a toughening agent, preferably alum, to the starch before milling.

The extent of undesirable fusing of the granules produced by physical modification of starch may be quickly determined by this arbitrary test: Ten grams of the starchy material of known moisture content ground to pass a 65 mesh screen is stirred for 15 minutes with 100 ml. of water at 30° C. The suspension thus obtained is filtered through No. 17 bolting silk, and the material retained by the silk is washed thereon with a small amount of fresh water, collected, dried, and weighed. The proportion of such unfilterable material in starches modified under optimum conditions of our process is quite small, usually amounting to not more than 5 to 10 per cent of the total dry substance.

The following examples of our process will illustrate in greater detail the method of practicing this invention. Unless otherwise specified, all MacMichael viscosities in the following axamples were determined with the No. 26 wire, and all dispersibilities in cold water were determined as described above.

Example 1

*Step 1, providing moist starch.*—Powdered corn starch containing about 12 per cent moisture was thoroughly mixed with sufficient water to raise its moisture content to about 28 per cent.

*Step 2, milling the moist starch.*—The moistened starch was fed into the nip of a pair of hollow smooth steel rolls rotating in opposite directions on horizontal axes and spaced about 0.012 inch apart. Water at a temperature of about 70° F. was circulated through the rolls to keep them from becoming hot from friction. The rolls were 6 inches in diameter. One of them rotated at a peripheral speed of 45 feet per minute and the other at a peripheral speed of 36 feet per minute, thus providing a frictional or differential ratio of 1.25 to 1.00. The milled moistened starch adhered to the rolls in a more or less continuous film or sheet. This sheet was stripped from the rolls by cutting blades which pressed against the rolls at all times. The stripped material was then passed once more through the rolls.

*Step 3, drying and grinding the milled starch.*—The sheet of milled moist starch was dried to about 12 per cent moisture in a current of air heated to about 140° F., and then ground to pass a 65 mesh screen in conventional starch grinding equipment.

The product thus obtained dispersed in 10 parts of cold water to such an extent that 75 per cent of the dry substance content of the dispersion passed through a No. 17 bolting silk, and the viscosity of a dispersion of 30 parts of the product in 250 parts of cold water measured on a MacMichael viscosimeter was 29° M. The corresponding MacMichael viscosity of the original starch was 2° M., and the corresponding dispersibility of the original starch in cold water was practically 100 per cent.

Example 2

Powdered waxy maize starch containing about 11 per cent moisture was thoroughly mixed with enough water to raise its moisture content to about 20 per cent. This moistened starch was then milled, dried, and ground according to the procedure described under Example 1. The modified starch thus obtained was 81 per cent dispersible in cold water, and the MacMichael viscosity of its cold water dispersion (30 parts of 12 per cent moisture in 250 parts of water) was 38° M. The corresponding MacMichael viscosity of the original starch was 3° M.

Example 3

Powdered sorghum starch containing about 11 per cent moisture was thoroughly mixed with enough water to raise its moisture content to about 25 per cent. This moistened starch was then milled, dried, and ground according to the procedure described under Example 1. The modified starch thus obtained was 81 per cent dispersible in cold water, and the MacMichael viscosity of its cold water dispersion (30 parts of 12 per cent moisture in 250 parts of water) was 97° M. The corresponding MacMichael viscosity of the original starch was 10° M.

Example 4

Powdered wheat starch adjusted to a moisture content of 25 per cent was milled, dried, and ground by the procedure used in Example 1. The product was 79 per cent dispersible in cold water, and the MacMichael viscosity of its cold water dispersion was 116° M. The corresponding viscosity of the original starch was 3° M.

Example 5

Powdered rice starch adjusted to 20 per cent moisture was modified according to the procedure described under Example 1. The milling raised the MacMichael viscosity of its cold water dispersion of the starch from 25° M. to 85° M., and the modified product was 78 per cent dispersible in cold water.

Example 6

Powdered tapioca starch adjusted to 20 per cent moisture was milled, dried, and ground as described under Example 1. This treatment raised the MacMichael viscosity of its cold water dispersion of the starch from 7° M. to 145° M., and the modified starch was 83 per cent dispersible in cold water.

Example 7

Powdered sweet potato starch adjusted to a moisture content of 25 per cent was modified according to the procedure of Example 1. The product thus obtained was 80 per cent dispersible in cold water, and the MacMichael viscosity of its dispersion in cold water was 193° M. The corresponding MacMichael viscosity of the original starch was 7° M.

Example 8

Powdered Irish potato starch adjusted to 22 per cent moisture was milled, dried, and ground as described under Example 1. This treatment increased the MacMichael viscosity of the dispersion of the starch in cold water from an original value of 60° M. to a final value of 150° M. The modified starch was 81 per cent dispersible in cold water.

Example 9

Mill starch, obtained in the wet milling of corn and containing about 5 per cent protein, was dried to a moisture content of 29 per cent and modified according to the procedure of Example 1. The modified material was 77 per cent dispersible in 10 parts of cold water, and the MacMichael viscosity of its dispersion in cold water was 26° M. The corresponding MacMichael viscosity of the original material was 3° M.

Example 10

Table tails, obtained in the wet milling of corn and consisting of about 50 per cent starch, 40 per cent protein, and 10 per cent of other materials including fat, fiber, and pigment, were adjusted to a moisture content of 28 per cent and then milled, dried, and ground as described in Example 1. This treatment raised the MacMichael viscosity of its dispersion in cold water from 2° M. to 16° M. The modified product was 90 per cent dispersible in 10 parts of cold water and examination of its dilute aqueous suspension under a microscope with polarized light showed that about 80 per cent of the starch granules had lost their polarization "crosses."

Example 11

Wheat flour, containing about 76 per cent starch and about 12 per cent protein, was milled, dried, and ground according to the procedure described in Example 1. The product thus obtained was 74 per cent dispersible in 10 parts of cold water, and the MacMichael viscosity of its cold water dispersion was 91° M. as compared to 10° M. for the original flour.

Example 12

Separate lots of ordinary corn starch adjusted to a moisture content of 28 per cent were passed through the differential rolls used in Example 1 a varied number of times, then dried and ground as described under that example. The modified starches obtained in this manner were examined with the Stormer viscosimeter, to determine the relationship between number of passes through the rolls and degree of modification thus obtained.

Results of these examinations are collected in the following table:

| Number of Passes | Pasting Temperature [1] |
|---|---|
| | °F. |
| 1 | 155 |
| 2 | 146 |
| 3 | 122 |
| 4 | 116 |
| 5 | 95 |

[1] Temperature at which Stormer viscosity is 10 seconds.

Example 13

Separate lots of ordinary corn starch thoroughly mixed with varying minor proportions of aluminum sulfate in the form of an aqueous solution and adjusted to moisture content of about 25 per cent based on the starch were milled, dried, and ground as described under Example 1. The modified starches obtained in this way were examined for dispersibility in cold water and for viscosity of cold water suspension by the above described procedures to determine the effects of variable alum content on the modification and fusing of the starch. Results of these examinations are summarized in the following table:

| Per cent Hydrated Alum Based on Starch | MacMichael Viscosity [1] of Cold Water Suspension | Per cent of Dry Substance Non-dispersible in Cold Water to Pass No. 17 Silk |
|---|---|---|
| 0 | 230 | 21 |
| 0.5 | 200 | 19 |
| 1.0 | 165 | 16 |
| 1.5 | 85 | 13 |
| 2.0 | 35 | 9.3 |
| 3.0 | 20 | 5.4 |

[1] Using No. 30 wire.

Example 14

Separate lots of a thin boiling acid modified corn starch adjusted to various moisture contents were milled, dried, and ground as described under Example 1. Cold water suspensions of the products thus prepared were examined with a MacMichael viscosimeter using a No. 30 wire to determine the effect of moisture content on degree of modification. Results of the examination are collected in the following table:

| Per cent Moisture | Viscosity (° M) |
|---|---|
| 13 | 75 |
| 17.4 | 260 |
| 20.5 | 410 |
| 23.6 | 270 |
| 26.3 | 210 |
| 28.8 | 100 |
| 31.2 | 55 |

The acid modified starch was prepared by the conventional method of steeping corn starch in 0.5 per cent sulfuric acid at 125° F. until its fluidity, as measured by the procedure described by H. Buel, 8th International Congress of Applied Chemistry, 1912, section VI a, page 63, was reduced to a value of 70 ml. When viewed under the microscope with polarized light, practically all of the granules of this starch exhibited polarization "crosses." After being milled as described above, only about a fifth or sixth of them exhibited the "crosses."

Example 15

Separate lots of ordinary corn starch adjusted to various moisture contents were milled, dried, and ground according to the procedure described under Example 1. Suspensions in cold water of the modified starches thus prepared were examined with the MacMichael viscosimeter using a No. 30 wire to determine the effect of varying moisture content on degree of modification. Results of the examination are collected in the following table:

| Per cent moisture | Viscosity (° M.) |
|---|---|
| 17.0 | 19 |
| 20.4 | 22 |
| 23.6 | 99 |
| 26.5 | 214 |
| 29.0 | 77 |
| 31.6 | 26 |

It will be apparent that operation of the differential rolls can be varied in many respects from that illustrated in the foregoing examples. For example, the diameter of the rolls may be varied to suit the needs and preferences of the producer of the modified starch. The diameter of the rolls affects the ability of the rolls to bite into the feed, which in turn will affect the rate at which the starch passes through the rolls. Other things being equal, large diameter rolls take more "bite" on the feed than do small diameter rolls. The diameter of the rolls also affects the degree of mechanical working produced on the starch by each pass through the rolls. The area through which severe working of the starch occurs in small diameter rolls is narrow and approaches a line as the diameter becomes less and less. Increasing the diameter of the rolls increases the width of the working zone and thus increases the distance and time in which the shearing stresses can act during a single pass. For this reason, one pass on a large diameter roll may produce the same degree of starch modification as two or more passes on a small diameter roll, other conditions being equal.

Another factor in the operation of the differential rolls that may be varied over a wide range of values without departing from the scope of the invention or yielding an inoperative process is the peripheral speed of the rolls. Peripheral speeds of the fast roll ranging from 25 to 250 feet per minute have been successfully used. Other things being equal, shearing stresses on the starch granule, and hence modification of the same, increases with increasing peripheral speed of the rolls. Output of product per unit of time from a pair of rolls also increases with increasing peripheral speed.

The spacing between the rolls is somewhat more critical than the diameter or peripheral speed of the rolls. If this spacing is too large, very little power is absorbed by the starch and the degree of modification is slight. On the other hand, if the spacing is too small, especially at high peripheral speeds and high differential ratios, the starch granules may become fused together, yielding a product that dries to a tough horny mass difficult to grind and disperse in water. Roll spacings ranging from 0.003 to 0.030 inch have been successfully used. With very large rolls operating at high speeds and high differential ratios, it is possible to obtain substantial modification of starch at even greater roll spacings.

The friction ratio of the rolls is not limited to the value of 1.25 as illustrated in the foregoing examples. It may, for example, be as high as 3 to 1 or as low as 1.1 to 1. Shearing action on the starch granule increases with increasing friction ratio. Consequently, the same degree of modification can be accomplished with rolls operating at a high peripheral speed and low friction ratio as with rolls operating at a low peripheral speed and a high friction ratio.

In regard to keeping the starch below its pasting temperature while it passes through the differential rolls, it is to be understood that means other than cooling the rolls are available for this purpose. Since the heat is developed by friction, any means for controlling the friction within suitable limits may be used. For example, friction is decreased by decreasing the differential ratio of the rolls, by decreasing their peripheral speed and by increasing the distance between their faces. In general, however, controlling the starch temperature by controlling friction tends to increase the time required to produce a given degree of modification and for that reason cooling the rolls is the preferred method for controlling the temperature.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A method of modifying the starch content of starchy materials which comprises adjusting the moisture content thereof between the range of about 10 per cent to about 40 per cent and subjecting said starchy material to the distorting action and pressure of cooled differential rolls under such conditions that the temperature of the rolled starch always lies below the starch pasting temperature, whereby swelling of the starch and viscosity of its suspension in cold water are increased.

2. A method of modifying the starch content of starchy materials which comprises mixing the starchy material with not more than about 5 per cent of alum and subjecting said mixture, adjusted to a moisture content lying within the range of about 10 per cent to about 40 per cent, to the distorting action and pressure of differential rolls under such conditions that the temperature of the rolled starch always lies below the starch pasting temperature, whereby swelling of the starch and viscosity of its suspension in cold water are increased and objectionable fusing of the starch granules is decreased.

3. In a method of modifying waxy maize starch having a moisture content lying within the range of about 10 per cent to about 40 per cent, the improvement which comprises subjecting said starch to the shearing action and pressure of cooled differential rolls under such conditions that the temperature of the rolled starch always lies below the starch pasting temperature, whereby swelling of the starch and viscosity of its suspension in cold water are increased.

4. A method of modifying waxy maize starch which comprises mixing the starch with not more than about 5 per cent of alum and subjecting said mixture, adjusted to a moisture content lying within the range of about 10 per cent to about 40 per cent, to the shearing action and pressure of cooled differential rolls under such conditions that the temperature of the rolled starch always lies below the starch pasting temperature, whereby swelling of the starch and viscosity of its suspension in cold water are increased and objectionable fusing of the starch granules is decreased.

5. A method of modifying waxy maize starch which comprises mixing the starch with not more than about 5 per cent of formaldehyde and subjecting said mixture, adjusted to a moisture content lying within the range of about 10 per cent to about 40 per cent, to the shearing action and pressure of cooled differential rolls under such conditions that the temperature of the rolled starch always lies below the starch pasting temperature, whereby swelling of the starch and viscosity of its suspension in cold water are increased and objectionable fusing of the starch granules is decreased.

6. In a method of modifying sorghum starch having a moisture content lying within the range of about 10 per cent to about 40 per cent, the improvement which comprises subjecting said starch to the shearing action and pressure of cooled differential rolls under such conditions that the temperature of the rolled starch always lies below the starch pasting temperature, whereby swelling of the starch and viscosity of its suspension in cold water are increased.

7. A method of modifying sorghum starch which comprises mixing the starch with not more than about 5 per cent of alum and subjecting said mixture, adjusted to a moisture content lying within the range of about 10 per cent to about 40 per cent, to the shearing action and pressure of cooled differential rolls under such conditions that the temperature of the rolled starch always lies below the starch pasting temperature, whereby swelling of the starch and viscosity of its suspension in cold water are increased and objectionable fusing of the starch granules is decreased.

8. A method of modifying sorghum starch which comprises mixing the starch with not more than about 5 per cent of formaldehyde and subjecting said mixture, adjusted to a moisture content lying within the range of about 10 per cent to about 40 per cent, to the shearing action and pressure of cooled differential rolls under such conditions that the temperature of the rolled starch always lies below the starch pasting temperature, whereby swelling of the starch and viscosity of its suspension in cold water are increased and objectionable fusing of the starch granules is decreased.

9. A method of modifying corn starch granules, which comprises adjusting the moisture content thereof to a value lying within the range of about 17 per cent to about 34 per cent, and distorting said starch granules by passing them between cooled differential rolls at a temperature below the pasting temperature of the starch, whereby swelling of the starch and viscosity of its suspension in cold water are increased.

10. A method of modifying the starch content of starchy materials by subjecting said starchy materials to the distorting action and pressure of cooled differential rolls under such conditions that the temperature of the rolled starch always lies below the starch pasting temperature, whereby swelling of the starch and viscosity of its suspension in cold water are increased, the moisture content of said starch being such that there is relatively large absorption of power as it passes through said rolls, said moisture content falling within a range of 10 to 40 per cent.

11. A method of modifying the starch content of starchy materials which comprises mixing the starchy material with not more than about 5 per cent of a dispersing agent for the modified starch which will prevent fusing of starch granules during modification and subjecting said mixture, adjusted to a moisture content lying within the range of about 10 per cent to about 40 per cent, to the distorting action and pressure of cooled differential rolls under such conditions that the temperature of the rolled starch always lies below the starch pasting temperature, whereby swelling of the starch and viscosity of its suspension in cold water are increased.

DONALD W. HANSEN.
LOWELL O. GILL.
JOHN H. WRIGHTSMAN.

REFERENCES CITED

The following references are of record in the file of this patent:

UNITED STATES PATENTS

| Number | Name | Date |
|---|---|---|
| 2,105,052 | Oltmans | Jan. 11, 1938 |
| 2,214,018 | Gill | Sept. 10, 1940 |

FOREIGN PATENTS

| Number | Country | Date |
|---|---|---|
| 208,911 | Great Britain | Jan. 3, 1924 |
| 343,848 | Great Britain | Feb. 26, 1931 |
| 464,606 | Great Britain | Apr. 21, 1937 |

OTHER REFERENCES

Alsberg et al., J. Biol. Chem. 63, 56, 57 (1925), Abst. in Walton "Comprehensive Survey of Starch Chem." 1928, Chem. Cat. Co., p. 83, and C. A., 19, 3612 (1925).

Radley, "Starch and its Derivations," 2nd ed. 1944, D. Van Nostrand Co., pages 253, 254.